Patented Feb. 18, 1936

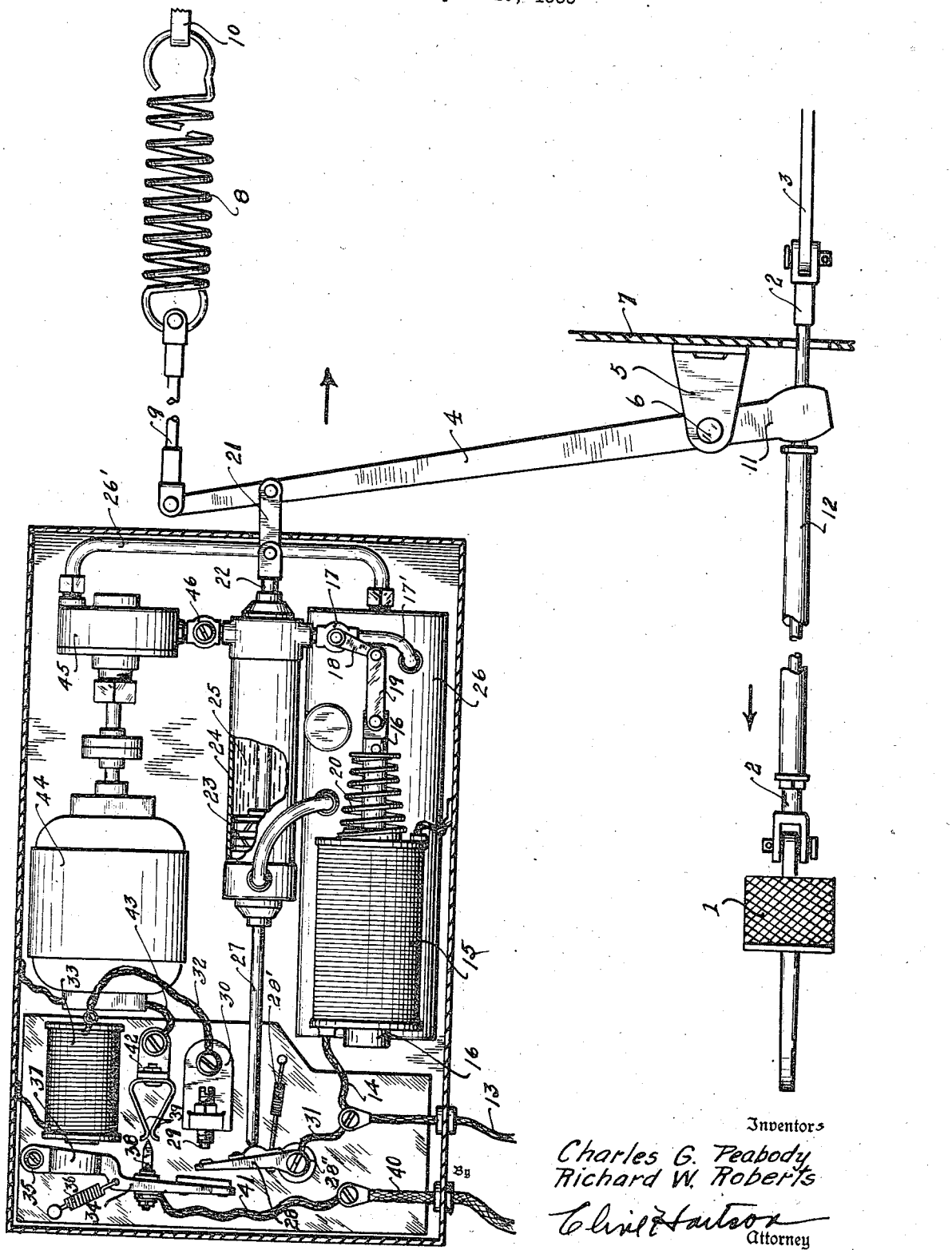

2,031,062

UNITED STATES PATENT OFFICE 2,031,062

AUTOMATIC PARKING BRAKE

Charles G. Peabody and Richard W. Roberts,
Portland, Oreg.

Application April 15, 1935, Serial No. 16,395

6 Claims. (Cl. 192—3)

This invention relates to vehicle brakes and consists of an automatic brake applicator for parking purposes, commonly known as the emergency brake. This automatic feature is particularly adapted for automobiles, trucks, busses and the like, causing the parking brakes to be applied without any thought given by the operator of the vehicle.

The primary object of this invention is to provide an automatic mechanism for applying the parking or emergency brake when the ignition switch of the motor has been turned in off position.

Another object of this invention is to apply the brake by a spring action and releasing the brakes by the automatic mechanism hereinafter described. In using this principle the brakes will be applied in case anything happens to the automatic control mechanism.

A further object of this invention is to provide an efficient and easily installed mechanism for manipulating the parking or emergency brake system of any vehicle.

It will be readily understood that there are other uses to which my invention can be adapted to besides the applications just mentioned above.

Other, further and additional objects of the invention will be apparent upon reading the description thereof, aided by the accompanying drawing, wherein:

Referring to the drawing, the automatic control system is illustrated, having case and parts broken away for convenience of illustration, the same being connected up to the emergency brake mechanism of a vehicle.

1 indicates the foot pedal of the braking system of a standard automobile. The brake rod 2 connects the brake pedal with the rod equalizer bar 3 leading to the brakes. A brake lever 4 is pivotally mounted to the bracket 5 at 6, the bracket 5 is mounted to the frame 7 of the vehicle. When the foot pedal 1 is manipulated by the foot the brake rod 2 operates independent of the brake arm 4, but when the brake arm 4 is permitted to be pulled to the right as indicated by the arrow by the tension of the spring 8, connected to the lever 4 by the link 9 and anchored to the frame support 10 at its opposite end the lever arm 11 presses against the end of the tube 12 forcing the brake rod 2, in the direction of the arrow, thus applying and holding the brakes. When the spring 8 is allowed to pull the lever 4, in the direction of the arrow, the emergency or parking brakes are in locked position which is a condition that exists when the ignition switch of the motor is in off position. This is the feature of our invention that makes it impossible not to apply the parking brake when the vehicle is parked.

When the ignition switch of the motor is turned on electric energy is supplied to the conductor 13, part of this energy goes through the conductor 14 and energizes the solenoid 15 pulling its core 16 to the left, to the position shown in the drawing. The purpose of the solenoid 15 is to manipulate the valve 17 through the action of the crank 18 being connected to the solenoid 16 by the link 19. When the brakes are applied the spring 20 forces the solenoid core 16 to the right, turning the crank 18 to a position where the valve 17 is open. The brake arm 4 is connected by link 21 to the piston rod 22 having a piston 23 operating within the cylinder 24. In the position shown in the drawing the brakes are shown in released position. In case the ignition switch is turned off the solenoid 15 is demagnetized allowing the spring 20 to force the core 16 to the right opening the valve 17. This allows the liquid 25 to pass through the valve 17 out of the cylinder 24 and into the reservoir 26 by the action of spring 8 pulling the lever arm 4 and the piston 23 to the right, thus applying the parking or the emergency brake. An extension 27 of the piston rod 22 manipulates the contact switch 28 allowing this switch to contact the point 29 of the terminal 30 whenever the brakes are applied, or allows this switch to remain closed until the brakes are fully released. When the ignition switch is turned energy is conducted to the switch 28 by the conductor 31, contact point 29, terminal 30, conductor 32 energizing the solenoid 33. The switch 28 is pivotally mounted at 28'' and normally held closed by the spring 28'. A special switch 34 pivotally mounted at 35 normally held in open position by the spring 36 is closed by the action of the magnetized solenoid 33 attracting the armature 37 of the switch 34, causing the contact blade 38 to engage the blade switch 39, closing the electric circuit from the battery through the conductors 40, 41, blade 38, switch blades 39, terminal 42 and conductor 43 leading to the motor 44. The motor 44 operates the pump 45, pumping a liquid from the reservoir 26 through pipe 26', out through the check valve 46 into the cylinder 24. The magnetizing of the solenoid 15 at the same time that the switch 34 is manipulated closes the valve 17 preventing the liquid 25 from passing therethrough, thereby forcing the piston to the left, by the liquid 25 being pumped from pump 45, pulling the brake arm 4 against the spring 8, releasing the brake. When the end 27 of the piston rod 22 engages the switch 28 it breaks the circuit through the solenoid 33 permitting the spring 36 to open the motor switch 34, thus stopping the motor and the pump from forcing liquid into the cylinder 24. The solenoid 15 remains magnetized holding the valve 17 in closed position until the motor switch is turned off, at which time the valve 17 will be open allowing the liquid 25 to escape from the cylinder 24, by way of pipe 17' into tank 26, and permitting the spring 8 to apply the brakes as heretofore described.

I do not wish to be limited to this particular form of construction as my invention is susceptible to other forms of embodiment still coming within the scope of my invention as hereinafter claimed.

Having described my invention, I claim:—

1. In an automatic parking brake for automotive vehicles, the combination including a master brake lever connected to the braking system of the vehicle and having release and applied positions, means constantly urging the lever to applied position, hydraulic means for moving the lever to release position, means in the ignition circuit of the vehicle operating when such circuit is open to release the hydraulic means so that the urging means moves the lever to applied position, and magnetic means in the ignition circuit operable when the circuit is closed to cause the hydraulic means to move the lever to release position.

2. In an automatic parking brake for automotive vehicles, the combination including a master brake lever connected to the braking system of the vehicle and having release and applied positions, spring means constantly urging the lever to applied position, hydraulic means for moving the lever to release position, means when the ignition circuit of the vehicle is open operating to release the hydraulic means so that the spring means moves the lever to applied position, magnetic means operating when the circuit is closed to overcome the last mentioned means, and a second magnetic means operating when the circuit is closed to cause the hydraulic means to move the lever to release position.

3. In an automatic parking brake for automotive vehicles, the combination including a master brake lever connected to the braking system of the vehicle and having release and applied positions, spring means constantly urging the lever to applied position, hydraulic means for moving the lever to release position, a member normally tending to release the hydraulic means, magnetic means overcoming the action of such means when the ignition circuit of the vehicle is closed, and a second magnetic means operating when the circuit is closed to cause the hydraulic means to move the lever to release position.

4. In an automatic parking brake for automotive vehicles, the combination including a master brake lever connected to the braking system of the vehicle and having release and applied positions, a spring constantly urging the lever to applied position, hydraulic means for moving the lever to release position against the action of the spring, a valve releasing the hydraulic means, a member normally tending to open the valve, magnetic means overcoming the action of the last mentioned means when the ignition circuit of the vehicle is closed, and a second magnetic means operating when the circuit is closed to cause the hydraulic means to move the lever to release position.

5. In an automatic parking brake for automotive vehicles, the combination including a master brake lever connected to the braking system of the vehicle and having release and applied positions, a spring constantly urging the lever to applied position, hydraulic means for moving the lever to release position against the action of the spring, actuating means therefor, a member normally tending to release the hydraulic means, magnetic means overcoming the action of the last means when the ignition circuit of the vehicle is closed, a second magnetic means operating when the circuit is closed to cause the actuating means to operate, and a switch in the circuit of the last mentioned means opened by the hydraulic means when the lever is in release position and stopping the actuating means.

6. In an automatic parking brake for automotive vehicles, the combination including a master brake lever connected to the braking system of the vehicle and having release and applied positions, a spring constantly urging the lever to applied position, hydraulic means for moving the lever to release position against the action of the spring, electrically operating pumping means for actuating the hydraulic means, a member normally tending to release the hydraulic means, magnetic means overcoming the action of the last means when the ignition circuit of the vehicle is closed, a second magnetic means operating when the circuit is closed to cause the pumping means to operate, and a circuit opening means to the electric pumping means operated by the hydraulic means when the brake lever is in release position.

CHARLES G. PEABODY.
RICHARD W. ROBERTS.